United States Patent
Park et al.

(10) Patent No.: US 12,472,639 B2
(45) Date of Patent: Nov. 18, 2025

(54) BATTERY GAP FILLER APPLICATOR AND APPLICATION METHOD

(71) Applicants: Hyundai Motor Company, Seoul (KR); Kia Corporation, Seoul (KR)

(72) Inventors: Jongmin Park, Ulsan (KR); Dong Ho Kwak, Ulsan (KR); SaHwan Kim, Ulsan (KR); Wonwoo Shin, Gyeongsangbuk-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 382 days.

(21) Appl. No.: 18/095,335

(22) Filed: Jan. 10, 2023

(65) Prior Publication Data

US 2024/0009854 A1    Jan. 11, 2024

(30) Foreign Application Priority Data

Jul. 7, 2022    (KR) ........................ 10-2022-0083726

(51) Int. Cl.
*B25J 9/00*    (2006.01)
*B25J 9/10*    (2006.01)
*B25J 11/00*    (2006.01)

(52) U.S. Cl.
CPC ........... *B25J 11/005* (2013.01); *B25J 9/0093* (2013.01); *B25J 9/1035* (2013.01)

(58) Field of Classification Search
None
See application file for complete search history.

(56) References Cited

U.S. PATENT DOCUMENTS

| | | | |
|---|---|---|---|
| 6,699,265 B1 * | 3/2004 | O'Phelan | A61N 1/3754 361/520 |
| 2009/0035658 A1 * | 2/2009 | Harada | H01M 50/516 429/211 |
| 2013/0164576 A1 * | 6/2013 | Cha | H01M 10/6554 429/72 |
| 2016/0288280 A1 * | 10/2016 | Lin | B25J 5/007 |
| 2022/0089237 A1 * | 3/2022 | Sverdlov | B25J 9/1697 |
| 2022/0282067 A1 * | 9/2022 | Yang | C08K 3/22 |

* cited by examiner

*Primary Examiner* — Truc M Do
(74) *Attorney, Agent, or Firm* — Fox Rothschild LLP

(57) ABSTRACT

Provided is a battery gap filler applicator applying a gap filler to a lower case of an electric vehicle battery system assembly (BSA), including: a plurality of orthogonal robots disposed at an upper portion of a conveyor device on which a lower case is seated; spaced apart from each other by a predetermined distance; moving at the upper portion of the conveyor device; and applying a resin and a hardener onto the lower case. The battery gap filler applicator may further include a booster pump supplying the resin and the hardener to the plurality of orthogonal robots; and a resin pump and a hardener pump filling the resin and the hardener, respectively to the booster pump.

16 Claims, 10 Drawing Sheets

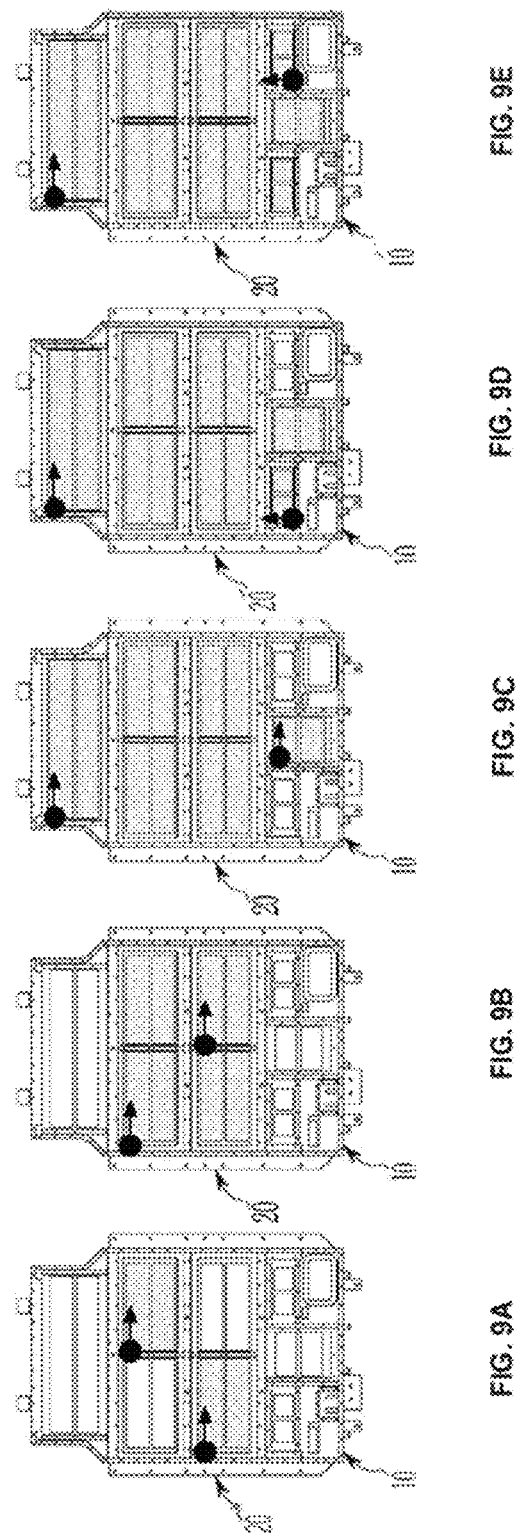

BATTERY GAP FILLER APPLICATOR AND APPLICATION METHOD

CROSS-REFERENCE TO RELATED APPLICATION

This application claims under 35 U.S.C. § 119(a) the benefit of Korean Patent Application No. 10-2022-0083726 filed in the Korean Intellectual Property Office on Jul. 7, 2022, the entire contents of which are incorporated herein by reference.

BACKGROUND

Technical Field

The present disclosure relates to an apparatus and a method for applying a gap filler before seating a battery on a lower case of an electric vehicle battery system assembly.

Background

A gap filler is a material serving to fill fine gaps between electronic parts. High-temperature heat generated from a heat source is quickly and effectively moved by resolving heat transmission interruption from air or foreign substances to increase product durability.

In a manufacturing process of a battery system assembly of an electric vehicle, a process of applying a gap filler is performed before seating a battery pack on a lower case, and this is a core process for preventing a battery cell from dissipating heat.

In the related art, as illustrated in FIGS. 1A and 1B, the gap filler is applied by placing four multi-joint robots 2 at left and right sides of a lower case 1 on a conveyor apparatus 3. In the gap filler applying apparatus, the multi joint robot 2 is applied for an application degree of freedom (angle tilting, 90° rotation), and four multi joint robots 2 are placed and used for shorting a filling time. Further, a resin pump 4 and a hardener pump 5 are connected to the respective multi-joint robots. Each of the resin pump 4 and the hardener pump 5 is connected to a booster pump 6 by a supply line 7.

However, in such a gap filler applying apparatus structure, an installation area becomes huge and it is difficult to share the resin/hardener pump, and the resin and hardener pumps should be individually installed, so investment cost is excessively required. Further, it is impossible for one robot to apply the gap filler in an entire region of the lower case, so it is disadvantageous in terms of productivity and maintainability.

The above information disclosed in this Background section is only for enhancement of understanding of the background of the disclosure, and therefore it may contain information that does not form the prior art that is already known in this country to a person of ordinary skill in the art.

SUMMARY

Accordingly, in order to solve the problem, the present disclosure has been made in an effort to provide a gap filler applicator and a gap filler application method which are capable of significantly reducing an installation area of an applicator by enabling gap filler application utilizing one applicator constituted by a plurality of orthogonal robots, and reducing investment cost by enabling resin and hardener pumps to be shared.

An exemplary embodiment of the present disclosure provides a battery gap filler applicator applying a gap filler to a lower case of an electric vehicle battery system assembly (BSA), including: a plurality of orthogonal robots disposed at an upper portion of a conveyor device on which a lower case is seated; spaced apart from each other by a predetermined distance; moving at the upper portion of the conveyor device; and applying a resin and a hardener onto the lower case; a booster pump supplying the resin and the hardener to the plurality of orthogonal robots; and a resin pump and a hardener pump filling the resin and the hardener, respectively to the booster pump.

The plurality of orthogonal robots may be provided as four at an upper location of an edge of the conveyor device.

The plurality of orthogonal robots may be installed to move in a 3-axis direction by engagement of a rack pinion gear.

The plurality of orthogonal robots may be installed to move on two X-axis rails parallel to each other, which are formed to extend in a direction vertical to a longitudinal direction of the conveyor device, and two X-axis rails parallel to each other may be installed to move along two Y-axis rails parallel to each other, which extend in the longitudinal direction of the conveyor device.

The plurality of orthogonal robots may include a gap filler application unit injecting and supplying the resin and the hardener onto the lower case, a Z-axis robot moving the gap filler application unit in a direction vertical to a surface of the lower case, a rotary actuator pivoting the gap filler application unit to form an angle in a progress direction of the conveyor device, and a rotary regulator tilting the gap filler application unit to form the angle with respect to the surface of the lower case.

The rotary actuator may pivot the gap filler application unit within an angle range of 90° in the progress direction of the conveyor device.

The rotary regulator may tilt the gap filler application unit within an angle range of −3° to +3°.

The rotary actuator and the rotary regulator may adjust the angle of the gap filler application unit by using a servo motor.

The booster pump may be constituted by plural numbers corresponding to the plurality of orthogonal robots, respectively.

The resin pump may be constituted by a main resin pump and a sub resin pump assisting resin filling of the main resin pump.

The hardener pump may be constituted by a main hardener pump and a sub hardener pump assisting hardener filling of the main hardener pump.

Meanwhile, another exemplary embodiment of the present disclosure provides a battery gap filler applying method of applying a gap filler to a lower case of an electric vehicle battery system assembly (BSA), which includes: receiving application target information from a manufacturing execution system (MES); receiving a task instruction by a programmable logic controller (PLC) based on the received application target information; determining whether a resin and a hardener are contained in a main pump; when it is determined that the resin and the hardener are contained in the main pump, filling each of the resin and the hardener in the booster pump from the main pump; determining whether four orthogonal robots are all normal among the plurality of orthogonal robots; performing a gap filler application task when it is determined that all of four orthogonal robots are normal; and when the gap filler application task is completed, transmitting application result information to the MES.

The battery gap filler applying method may further include: after the determining of whether the resin and the hardener are contained in the main pump, when it is determined that the resin and the hardener are not contained in the main pump, determining whether the resin and the hardener are contained in the sub pump.

When it is determined that the resin and the hardener are contained in the sub pump, each of the resin and the hardener may be filled in the booster pump from the sub pump, and when it is determined that the resin and the hardener are not contained in the sub pump, the gap filler application task may stop.

The battery gap filler applying method may further include: after the determining of whether all of four orthogonal robots are normal, when it is determined that all of four orthogonal robots are not normal, determining whether two orthogonal robots are normal among the plurality of orthogonal robots.

When it is determined that two orthogonal robots are normal, the gap filler application task may be performed, and when it is determined that two orthogonal robots are not normal, the gap filler application task may stop.

According to an exemplary embodiment of the present disclosure, it is possible to significantly reduce an installation area of an applicator by utilizing one applicator constituted by a plurality of orthogonal robots, and reduce investment cost by enabling resin and hardener pumps to be shared.

Further, a gap filler application unit which is tiltable or pivotable is configured in the plurality of orthogonal robots to ensure the filling time as four multi joint robots with one applicator.

Further, the gap filler can be applied to an entire region by one orthogonal robot, so the continuity of an application task is guaranteed even though some orthogonal robots are out of order, thereby enhancing productivity and maintainability.

BRIEF DESCRIPTION OF THE DRAWINGS

FIGS. 9A-9E are diagrams illustrating cases where the gap filler is applied to the lower case constituted by the asymmetric region of the vehicle type which is turned at 90° by using two orthogonal robots by the battery gap filler applicator according to an exemplary embodiment of the present disclosure.

DETAILED DESCRIPTION OF THE EMBODIMENTS

Figure 1A:
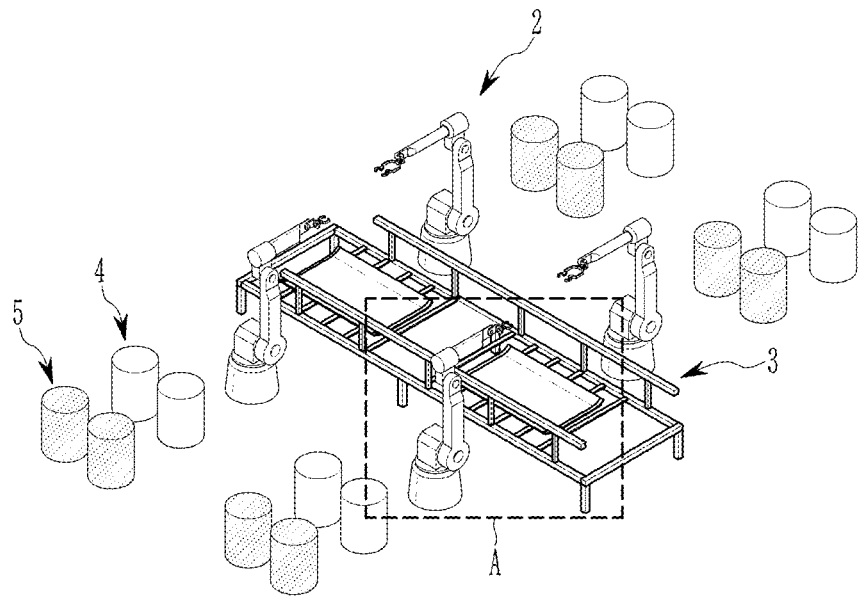
FIGS. 1A and 1B are diagrams illustrating a battery gap filler applicator utilizing a multi joint robot in the related art.
Figure 1B:
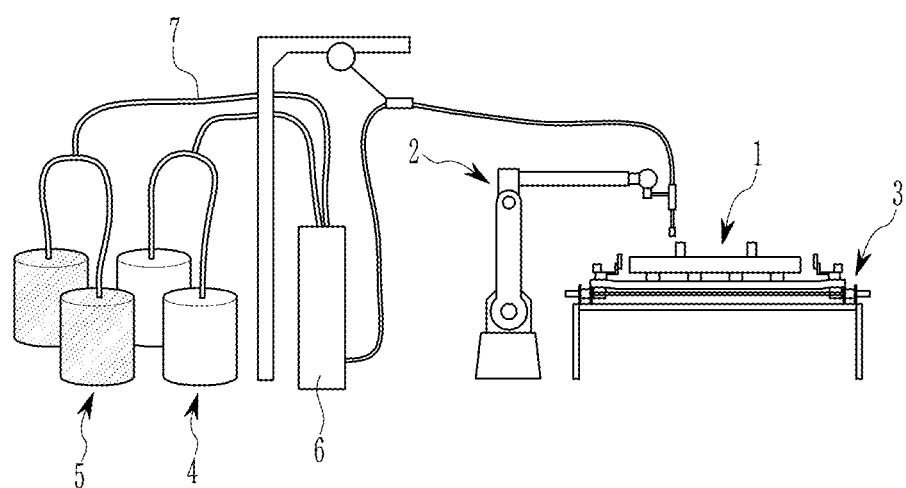

Hereinafter, exemplary embodiments of the present disclosure will be described more fully hereinafter with reference to the accompanying drawings so as to be easily implemented by those skilled in the art. The present disclosure may be implemented in various different forms and is not limited to exemplary embodiments described herein.

In addition, in various exemplary embodiments, the components having the same configuration will be described in one exemplary embodiment using the same reference numeral, and in other exemplary embodiments, only a different configuration from an exemplary embodiment will be described.

The drawings are schematic and not illustrated according to a scale. The relative dimensions and ratios of the parts in the drawings are shown in its size for clarity and convenience in the drawing, and are shown in its size, and any dimensions are just exemplary, not limited. In addition, the same reference signs are used to show similar characteristics in the same structure, elements or components that appear in two or more drawings. When any part of or referred to as being "above", "on" the other part, which might be directly above the other parts or may be a different part involves therebetween.

The exemplary embodiment of the present disclosure specifically illustrates an exemplary embodiment of the present disclosure. As a result, various modifications of a diagram are expected. Therefore, the exemplary embodiment is not limited to a specific form of an illustrated region, and for example, also includes a modification of a form by manufacturing.

Hereinafter, a structure of a battery gap filler applicator according to an exemplary embodiment of the present disclosure will be described in detail with reference to the accompanying drawings.

Figure 2:
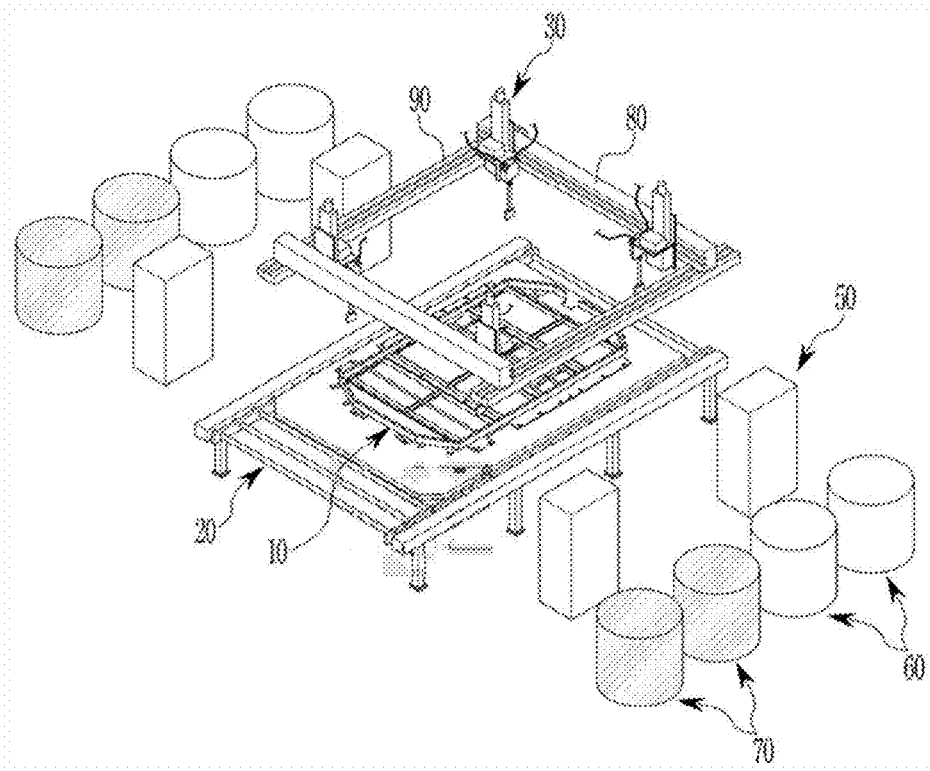
FIG. 2 is a diagram illustrating a battery gap filler applicator according to an exemplary embodiment of the present disclosure.
Figure 3:
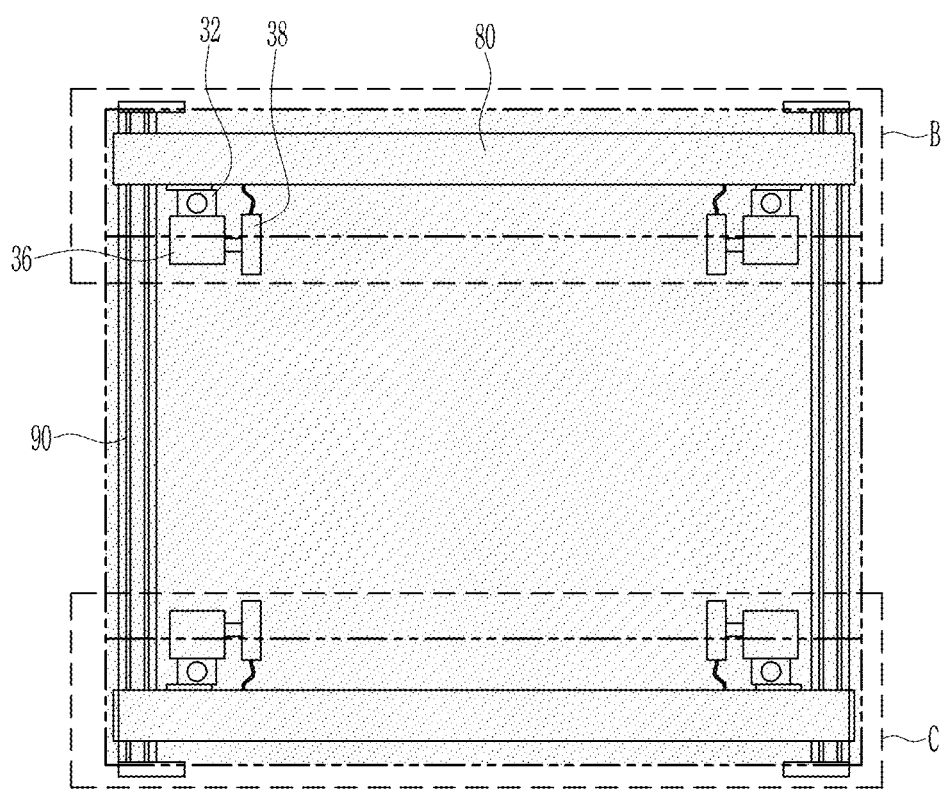
FIG. 3 is a plan view illustrating the battery gap filler applicator according to an exemplary embodiment of the present disclosure.

FIG. 2 is a diagram illustrating a battery gap filler applicator according to an exemplary embodiment of the present disclosure, and FIG. 3 is a plan view illustrating the battery gap filler applicator according to an exemplary embodiment of the present disclosure.

Referring to FIG. 2, the battery gap filler applicator according to an exemplary embodiment of the present disclosure as an applicator that applies a gap filler to a lower case of an electric vehicle battery system assembly (BSA) may include a plurality of orthogonal robots 30, a booster pump 50, and a resin pump 60, and a hardener pump 70.

The lower case 10 to which the gap filler is applied may be seated on an upper portion of a conveyor device 20, and the conveyor device 20 may move the lower case 10 in one direction and locates the lower case 10 at a lower portion of the plurality of orthogonal robots of the battery cap filler applicator. That is, the plurality of orthogonal robots 30 is disposed at the upper portion of the conveyor device 20 to be spaced apart from each other, and moves at the upper portion of the conveyor device 20 and applies a resin and a hardener onto the lower case 10.

The plurality of orthogonal robots 30 may be disposed at an upper location of an edge of the conveyor device 20 to be spaced apart from each other, and provided as four.

The plurality of orthogonal robots 30 may be installed to move in a 3-axis direction by engagement of a rack pinion gear. That is, the plurality of orthogonal robots 30 may move in an up and down direction vertical to a surface of the lower case 10, in a front and back direction parallel to a longitudinal direction of the conveyor device 20, and in a left and right direction vertical to the longitudinal direction of the conveyor device 20.

To this end, the plurality of orthogonal robots 30 may move by using an X-axis rail 80 and a Y-axis rail 90. Two X-axis rails 80 are disposed parallel to each other to be extended in a direction vertical to the longitudinal direction of the conveyor device 20, and two Y-axis rails 90 are disposed parallel to each other to be extended in the longitudinal direction of the conveyor device 20. Two orthogonal robots 30 are installed to move on one X-axis rail 80 and respective X-axis rails 80 are installed to move along the Y-axis rail 90. Therefore, the orthogonal robot 30 may move in an X-axis direction along the X-axis rail 80, and move in a Y-axis direction as the X-axis rail 80 moves along the Y-axis rail 90. Further, the orthogonal robot 30 may move in the up and down direction (Z-axis direction) vertical to the surface of the lower case 10 by a Z-axis robot 32 provided in the orthogonal robot 30 itself.

Meanwhile, the booster pump 50 supplies the resin and the hardener to the plurality of orthogonal robots 30. The booster pump 50 may be constituted by a plurality of booster pumps to correspond to the plurality of orthogonal robots 30, respectively. That is, when the orthogonal robot 30 is constituted by four orthogonal robots, the booster pump 50 may also be constituted by four booster pumps to correspond to the respective orthogonal robots 30. The booster pump 50 is connected to the orthogonal robot 30 by a supply pipe to supply the resin and the hardener to the orthogonal robot 30 from the booster pump 50.

The resin pump 60 and the hardener pump 70 are connected to the booster pump 50 to fill the resin and the hardener in the booster pump 50, respectively. The resin pump 60 may be constituted by a main resin pump and a sub resin pump assisting resin filling of the main resin pump. Further, the hardener pump 70 may be constituted by a main hardener pump and a sub hardener pump assisting hardener filling of the main hardener pump.

As illustrated in FIG. 3, two orthogonal robots 30 installed in one X-axis rail 80 may move in the X-axis direction along the X-axis rail, and as the X-axis rail 80 moves along the Y-axis rail 90, two orthogonal robots 30 may move jointly in the Y-axis direction. Therefore, two orthogonal robots 30 may simultaneously apply the gap filler to a surface region (region 'B') of the lower case 10 on the same line in the X-axis direction.

Further, two orthogonal robots 30 may also be installed on the other X-axis rail 80 disposed parallel to the X-axis rail 80 and may move in the X-axis direction along the X-axis rail 80, and as the X-axis rail 80 moves along the Y-axis rail 90, two orthogonal robots 30 may move jointly in the Y-axis direction. Therefore, two orthogonal robots 30 may simultaneously apply the gap filler to a surface region (region 'C') of the lower case 10 on the same line in the X-axis direction.

Meanwhile, since each of the plurality of orthogonal robots 30 may move to the upper portion of an entire surface of the lower case 10 by relative movement of the X-axis rail 80 and the Y-axis rail 90, even though some orthogonal robots 30 are out of order or the resin and the hardener are not supplied, the gap filler may be applied to the entire surface of the lower case by some orthogonal robots 30 which are normally operated.

Figure 4:
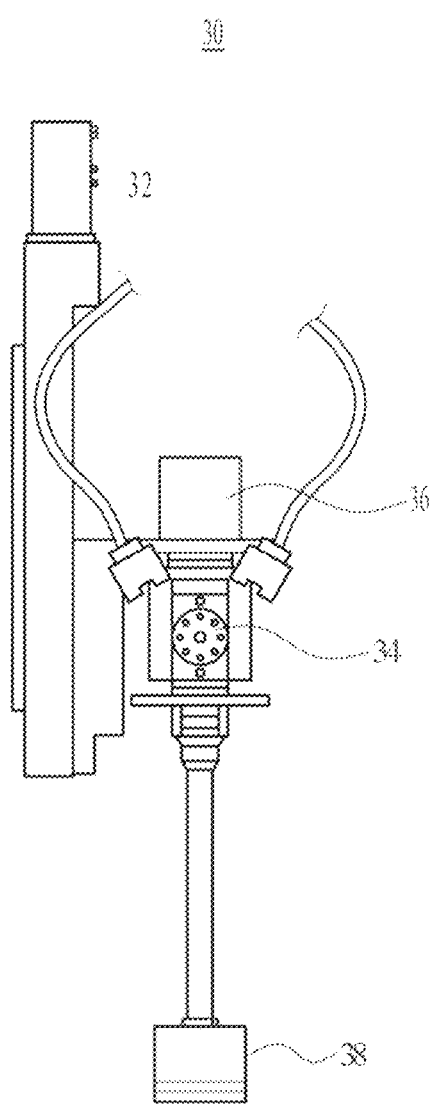
FIG. 4 is a diagram illustrating an orthogonal robot of the battery gap filler applicator according to an exemplary embodiment of the present disclosure.
Figure 5C:
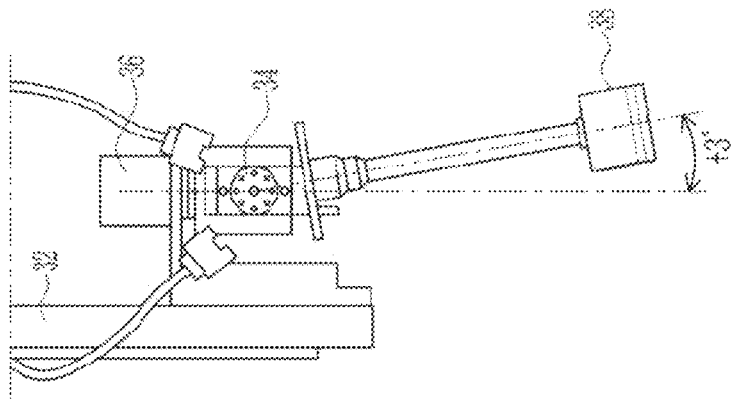
FIGS. 5A-5C are diagrams illustrating states in which a gap filler application unit of the battery gap filler applicator is tilted according to an exemplary embodiment of the present disclosure.
Figure 5B:
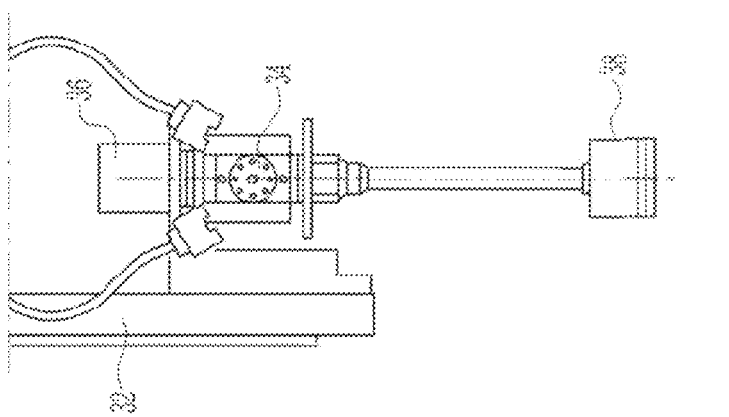
Figure 5A:
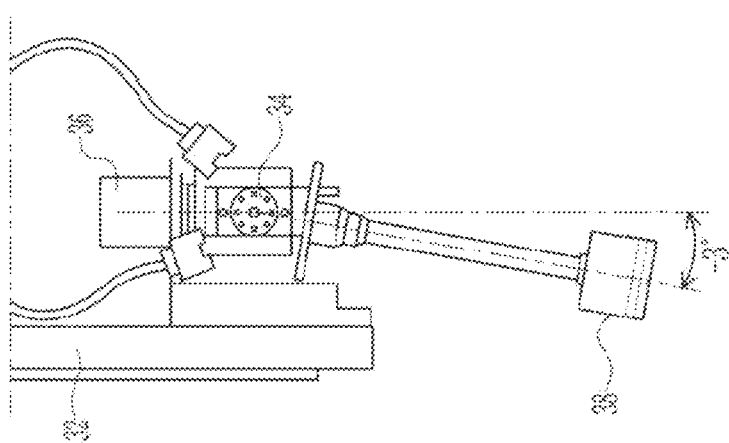
Figures 6A, 6B:
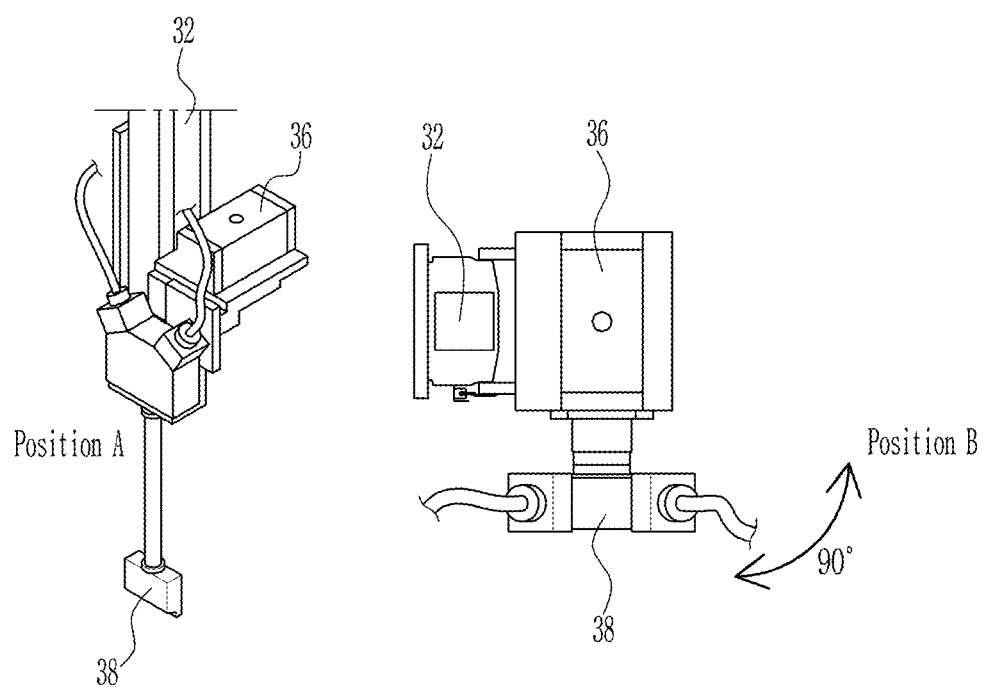
FIGS. 6A and 6B are diagrams illustrating states in which the gap filler application unit of the battery gap filler applicator is pivoted according to an exemplary embodiment of the present disclosure.

FIG. 4 is a diagram illustrating an orthogonal robot of the battery gap filler applicator according to an exemplary embodiment of the present disclosure, FIGS. 5A-5C are diagrams illustrating states in which a gap filler application unit of the battery gap filler applicator is tilted according to an exemplary embodiment of the present disclosure, and FIGS. 6A and 6B are diagrams illustrating states in which the gap filler application unit of the battery gap filler applicator is pivoted according to an exemplary embodiment of the present disclosure.

Referring to FIG. 4, the plurality of orthogonal robots 30 may include a gap filler application unit 38 injecting and supplying the resin and the hardener onto the lower case 10, a Z-axis robot 32 moving the gap filler application unit 38 in the vertical direction to the surface of the lower case 10, a rotary actuator 36 pivoting the gap filler application unit 38 to form an angle in a progress direction of the conveyor device 20, and a rotary regulator 34 tilting the gap filler application unit 38 to form the angle with respect to the surface of the lower case 10.

As illustrated in FIGS. 5A-5C, the rotary regulator 34 may tilt the gap filler application unit 38 within an angle range of −3° to +3°. The rotary regulator 34 (c) tilts the gap filler application unit 38 at 3° to the left side (a), to a vertical location (b), and at 3° to the right side while the orthogonal robot 30 is positioned at the upper portion of the lower case 10 to apply the gap filler to an upper surface of the lower case 10.

Further, as illustrated in FIGS. 6A and 6B, the rotary actuator 36 may pivot the gap filler application unit 38 within an angle range of 90° in the progress direction of the conveyor device 20. While the orthogonal robot 30 is positioned at the upper portion of the lower case the rotary actuator 36 may pivot the gap filler application unit 38 to be positioned at position 'A' or 'B'.

The rotary regulator 34 and the rotary actuator 36 may adjust the angle of the gap filler application unit 38 by using a servo motor, and individually or simultaneously tilts or pivots the gap filler application unit 38 to apply the gap filler to a target location.

Meanwhile, the orthogonal robot according to an exemplary embodiment of the present disclosure includes the gap filler application unit 38 in order to apply the gap filler, but may also replace the gap filler application unit 38 with a nut runner for another purpose, e.g., for a fastening process instead of the gap filler application unit.

Figure 7A:
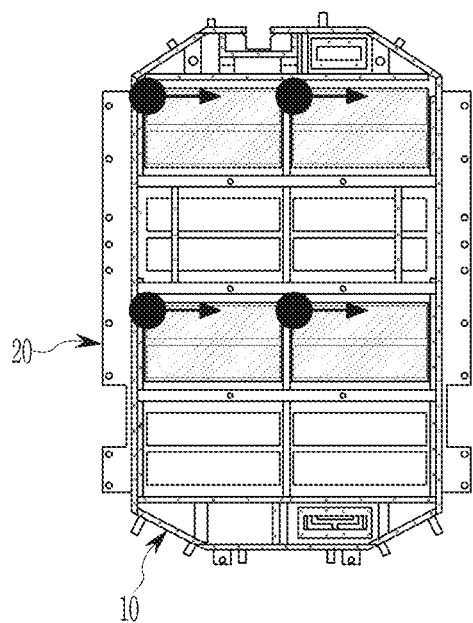
FIGS. 7A and 7B are diagrams illustrating cases where the gap filler is applied to a lower case constituted by a symmetric region of a vehicle type which is not turned at 90° by using four orthogonal robots by the battery gap filler applicator according to an exemplary embodiment of the present disclosure.
Figure 7B:
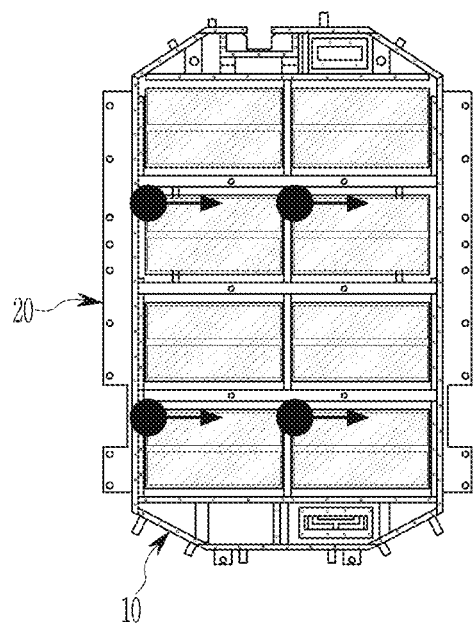

FIGS. 7A and 7B are diagrams illustrating cases where the gap filler is applied to a lower case constituted by a symmetric region of a vehicle type which is not turned at 90° by using four orthogonal robots by the battery gap filler applicator according to an exemplary embodiment of the present disclosure.

Referring to FIGS. 7A and 7B, in a symmetric form in which the lower case 10 is divided into eight regions, first, two orthogonal robots 30 at an upper side in the drawing and two orthogonal robots 30 at a lower side primarily may apply the gap filler to the lower case of four regions at the same time while moving from the left side to the right side in the X-axis direction along the X-axis rail 80 (*a*).

Thereafter, after the orthogonal robot 30 returns to an original location, the X-axis rail moves to the lower side along the Y-axis rail 90, and two upper orthogonal robots 30 and two lower orthogonal robots 30 move from the left side to the right side in the X-axis direction along the X-axis rail 80, the gap filler may be secondarily applied to the lower case 10 of four other regions at the same time (b).

Therefore, applying the gap filler is completed by a secondary application task on the lower case 10 divided into eight regions.

Figure 8C:
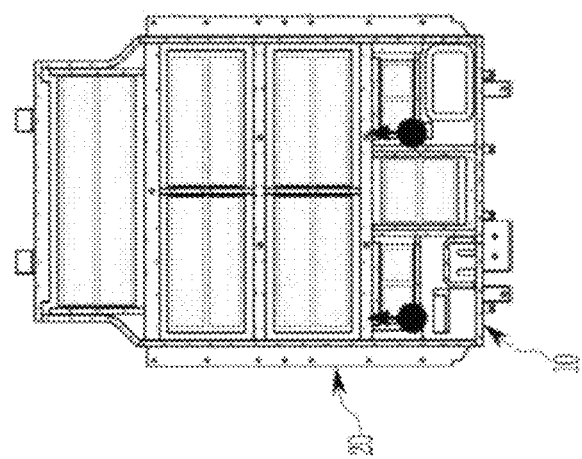
FIGS. 8A-8C are diagrams illustrating cases where the gap filler is applied to a lower case constituted by an asymmetric region of a vehicle type which is turned at 90° by using four orthogonal robots by the battery gap filler applicator according to an exemplary embodiment of the present disclosure.
Figure 8B:
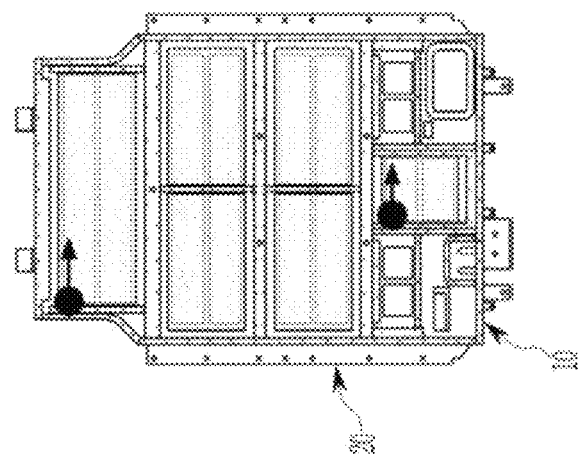
Figure 8A:
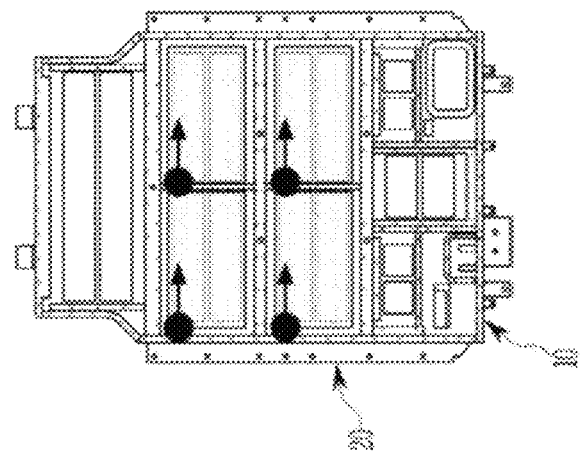

FIGS. 8A-8C are diagrams illustrating cases where the gap filler is applied to a lower case constituted by an asymmetric region of a vehicle type which is turned at 90° by using four orthogonal robots by the battery gap filler applicator according to an exemplary embodiment of the present disclosure.

Referring to FIGS. 8A-8C, when the lower case 10 is divided into eight regions and the gap filler application unit 38 needs to be pivoted at 90°, first, two orthogonal robots 30 at an upper side and two orthogonal robots 30 at a lower side primarily may apply the gap filler to the lower cases 10 of four regions at a central portion at the same time while moving from the left side to the right side in the X-axis direction along the X-axis rail 80 (*a*).

Thereafter, after the orthogonal robot 30 returns to the original location, the upper X-axis rail 80 and the lower X-axis rail 80 may move to the upper and lower regions of the lower cases 10 along the Y-axis rail 90, respectively, and one upper orthogonal robot 30 and one lower orthogonal robot 30 secondarily may apply the gap filler to the lower case 10 of two regions at the same time while moving from the left side to the right side along the X-axis rail 80(*b*).

Thereafter, after the orthogonal robot 30 returns to the original location, the lower X-axis rail 80 may move onto two left and right lower regions of the lower case 10 along the Y-axis rail 90, and the gap filler application unit 38 may rotate at an angel of 90° by the rotary actuator 36. In addition, the gap filler is tertiarily applied onto two left and right lower regions of the lower case 10 toward the upper side from the lower side at the same time (c).

Therefore, applying the gap filler is completed by a tertiary application task on the lower case 10 divided into eight regions.

FIGS. 9A-9E are diagrams illustrating cases where the gap filler is applied to the lower case constituted by the asymmetric region of the vehicle type which is turned at 90° by using two orthogonal robots by the battery gap filler applicator according to an exemplary embodiment of the present disclosure.

When two orthogonal robots 30 are out of order or a filling time is extra, the orthogonal robot 30 which is normally operated or is to be used is disposed on the region of the lower case as illustrated in FIGS. 9A-9E, and as described with reference to FIGS. 7 and 8, the gap filler may be applied to the entire surface of the lower case 10 sequentially by using the movement along the X-axis rail 80 of the orthogonal robot 30, the movement along the Y-axis rail 90 of the X-axis rail 80, and a pivot operation of the gap filler application unit 38.

In FIGS. 9A-9E, the gap filler may be primarily applied to the lower case 10 of two regions at the central portion at the same time (a), the gap filler is secondarily applied to the lower case 10 of another two regions at the central portion at the same time (b), and the gap filler is tertiarily applied to the lower case 10 of upper and lower regions at the same time (c). Thereafter, fourth and fifth application tasks are sequentially performed on two left and right lower regions of the lower case 10 by the gap filler application unit 38 which rotates at 90°.

Therefore, applying the gap filler is completed by the fifth application task on the lower case 10 divided into eight regions.

Figure 10:
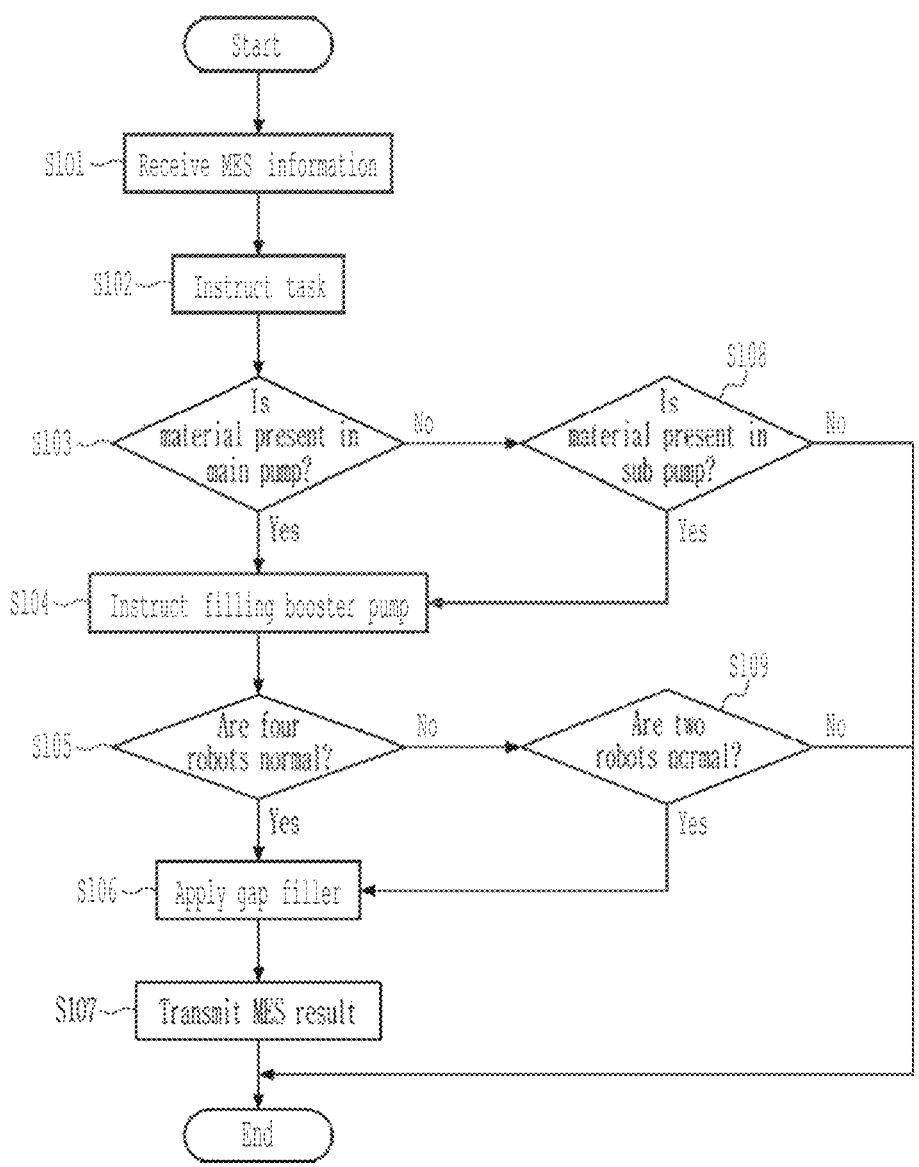
FIG. 10 is a flowchart illustrating a gap filler applying method according to an exemplary embodiment of the present disclosure.

FIG. 10 is a flowchart illustrating a battery gap filler applying method according to an exemplary embodiment of the present disclosure.

Referring to FIG. 10, the battery gap filler applying method according to an exemplary embodiment of the present disclosure as an application method using the battery gap filler applicator described with reference to FIGS. 2 to 9 may first receive application target information from a manufacturing execution system (MES) (S101).

Thereafter, a task instruction is received by a programmable logic controller (PLC) based on the received application target information (S102). For such a purpose, the PLC may be implemented by one or more processors which operate by a set program and the set program may be programmed to perform each step of the battery gap filler applying method according to the exemplary embodiment of the present disclosure.

Thereafter, it may be determined whether a resin and a hardener are contained in a main pump (S103). When it is determined that the resin and the hardener are contained in the main pump, each of the resin and the hardener is filled in a booster pump 50 from the main pump (S104).

Thereafter, it may be determined whether four orthogonal robots 30 among a plurality of orthogonal robots 30 are all normal (S105), and when it is determined that all of four orthogonal robots 30 are normal, the gap filler application task is performed (S106).

When the gap filler application task is completed, application result information may be transmitted to the MES (S107). When the gap filter application task is completed, the orthogonal robot 30 returns to an original location for a next task.

After it is determined whether the resin and the hardener are contained in the main pump (S103), when it is determined that the resin and the hardener are not contained in the main pump, it may be determined whether the resin and the hardener are contained in a sub pump (S108).

In this case, when it is determined that the resin and the hardener are contained in the sub pump, each of the resin and the hardener may be filled in the booster pump 50 from the sub pump, and when it is determined that the resin and the hardener are not contained in the sub pump, the gap filler application task may stop and the orthogonal robot 30 may return to the original location.

Meanwhile, after it is determined whether all of four orthogonal robots 30 are normal (S105), when it is determined that all of four orthogonal robots 30 are not normal, it may be determined whether two orthogonal robots 30 among the plurality of orthogonal robots 30 are normal (S109).

In this case, when it is determined that two orthogonal robots 30 are normal, the gap filler application task may be performed, and when it is determined that two orthogonal robots are not normal, the gap filler application task may stop, and the orthogonal robot 30 may return to the original location.

As such, after it is first checked whether the resin/hardener is filled in the main pump for applying the gap filler, if the resin/hardener is not filled, the resin/hardener may be filled in the booster pump 50 by utilizing the sub pump. Further, the application task may be performed by utilizing all of four orthogonal robots at normal times, but if some orthogonal robots are out of order, the application task may be executed by using the remaining orthogonal robots, thereby guaranteeing the continuity of the task without line stop.

As such, according to an exemplary embodiment of the present disclosure, it is possible to significantly reduce an installation area of an applicator by utilizing one applicator constituted by a plurality of orthogonal robots, and reduce investment cost by enabling resin and hardener pumps to be shared.

Further, a gap filler application unit which is tiltable or pivotable may be configured in the plurality of orthogonal robots to ensure the filling time as four multi joint robots with one applicator.

Further, the gap filler can be applied to an entire region by one orthogonal robot, so the continuity of an application task is guaranteed even though some orthogonal robots are out of order, thereby enhancing productivity and maintainability.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

<Description of symbols>

| | |
|---|---|
| 10: | Lower case |
| 20: | Conveyor device |
| 30: | Orthogonal robot |
| 32: | Z-axis robot |
| 34: | Rotary regulator |
| 36: | Rotary actuator |
| 38: | Gap filler application unit |
| 50: | Booster pump |
| 60: | Resin pump |
| 70: | Hardener pump |
| 80: | X-axis rail |
| 90: | Y-axis rail |

What is claimed is:

1. A battery gap filler applicator applying a gap filler to a lower case of an electric vehicle battery system assembly (BSA), comprising:
    a plurality of orthogonal robots disposed at an upper portion of a conveyor device on which a lower case is seated, the plurality of orthogonal robots being spaced apart from each other by a predetermined distance, the plurality of orthogonal robots configured to move at the upper portion of the conveyor device, and the plurality of orthogonal robots configured to apply a resin and a hardener onto the lower case,
    wherein the plurality of orthogonal robots includes:
        a gap filler application unit injecting and supplying the resin and the hardener onto the lower case,
        a Z-axis robot moving the gap filler application unit in a direction vertical to a surface of the lower case,
        a rotary actuator pivoting the gap filler application unit to form an angle in a progress direction of the conveyor device, and
        a rotary regulator tilting the gap filler application unit to form the angle with respect to the surface of the lower case,
    wherein the rotary actuator pivots the gap filler application unit within an angle range of about 90 in the progress direction of the conveyor device, and
    wherein the rotary regulator tilts the gap filler application unit within an angle range of about −3 to about +3.

2. The battery gap filler applicator of claim 1, wherein:
    the plurality of orthogonal robots is provided as four at an upper location of an edge of the conveyor device.

3. The battery gap filler applicator of claim 1, wherein:
    the plurality of orthogonal robots is installed to move in a 3-axis direction by engagement of a rack pinion gear.

4. The battery gap filler applicator of claim 1, wherein:
    the plurality of orthogonal robots is installed to move on two X-axis rails parallel to each other, which are formed to extend in a direction vertical to a longitudinal direction of the conveyor device, and
    the two X-axis rails parallel to each other are installed to move along two Y-axis rails parallel to each other, which extend in the longitudinal direction of the conveyor device.

5. The battery gap filler applicator of claim 1, wherein:
    the rotary actuator and the rotary regulator adjust the angle of the gap filler application unit by using a servo motor.

6. The battery gap filler applicator of claim 1, further comprising a booster pump supplying the resin and the hardener to the plurality of orthogonal robots.

7. The battery gap filler applicator of claim 6, further comprising a resin pump and a hardener pump filling the resin and the hardener, respectively, to the booster pump.

8. The battery gap filler applicator of claim 6, wherein:
    the booster pump is constituted by plural numbers corresponding to the plurality of orthogonal robots, respectively.

9. The battery gap filler applicator of claim 7, wherein:
    the resin pump is constituted by a main resin pump and a sub resin pump assisting resin filling of the main resin pump.

10. The battery gap filler applicator of claim 1, wherein:
    the hardener pump is constituted by a main hardener pump and a sub hardener pump assisting hardener filling of the main hardener pump.

11. A battery gap filler applying method using a gap filler applicator for applying a gap filler to a lower case of an electric vehicle battery system assembly (BSA), the battery gap filler applying method comprising:
    providing the gap filler applicator including a plurality of orthogonal robots disposed at an upper portion of a conveyor device on which a lower case is seated, the plurality of orthogonal robots being spaced apart from each other by a predetermined distance, the plurality of orthogonal robots configured to move at the upper portion of the conveyor device, and the plurality of orthogonal robots configured to apply a resin and a hardener onto the lower case;
    receiving application target information from a manufacturing execution system (MES);
    receiving a task instruction by a programmable logic controller (PLC) based on the received application target information;
    determining whether the resin and the hardener are contained in a main pump;
    filling each of the resin and the hardener in a booster pump from the main pump when it is determined that the resin and the hardener are contained in the main pump;

determining whether four orthogonal robots are all normal among the plurality of orthogonal robots; and performing a gap filler application task when it is determined that all of the four orthogonal robots are normal.

12. The battery gap filler applying method of claim 11, further comprising:

after determining whether the resin and the hardener are contained in the main pump, when it is determined that the resin and the hardener are not contained in the main pump, determining whether the resin and the hardener are contained in a sub pump.

13. The battery gap filler applying method of claim 12, wherein:

when it is determined that the resin and the hardener are contained in the sub pump, each of the resin and the hardener is filled in the booster pump from the sub pump, and when it is determined that the resin and the hardener are not contained in the sub pump, the gap filler application task stops.

14. The battery gap filler applying method of claim 11, further comprising:

after determining whether all of the four orthogonal robots are normal, when it is determined that all of the four orthogonal robots are not normal, determining whether two orthogonal robots are normal among the plurality of orthogonal robots.

15. The battery gap filler applying method of claim 14, wherein:

when it is determined that the two orthogonal robots are normal, the gap filler application task is performed, and when it is determined that the two orthogonal robots are not normal, the gap filler application task stops.

16. The battery gap filler applying method of claim 14, further comprising:

transmitting application result information to the MES when the gap filler application task is completed.

* * * * *